Aug. 29, 1933.  E. R. EVANS  1,924,112
BRAKE CONSTRUCTION
Original Filed March 30, 1928   3 Sheets-Sheet 3
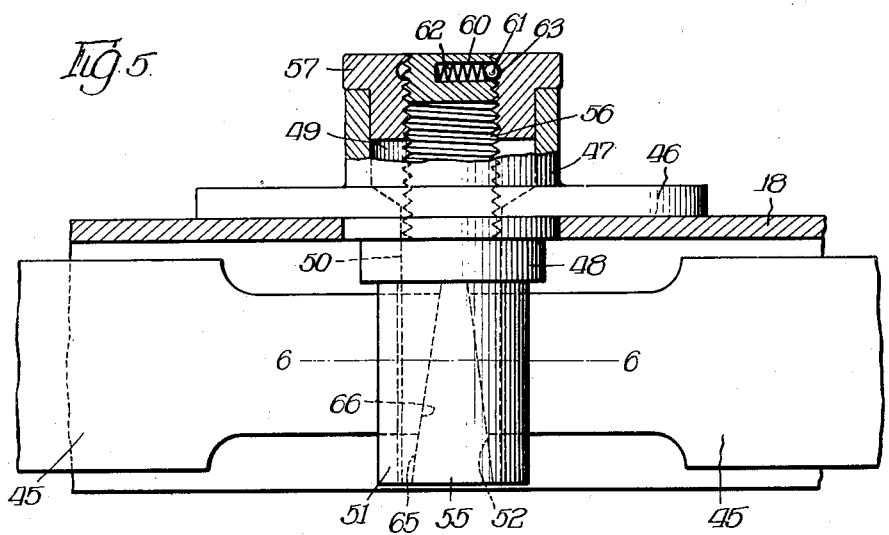
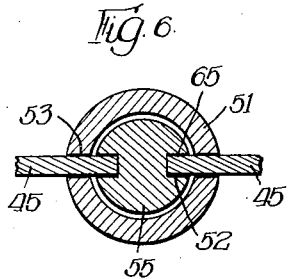
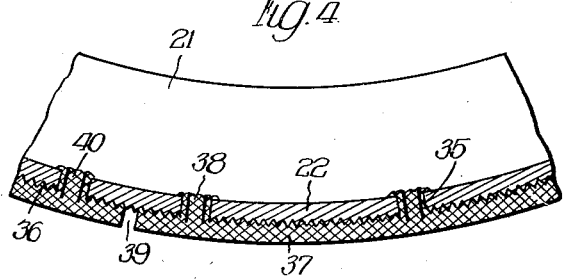
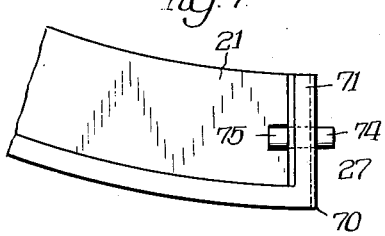
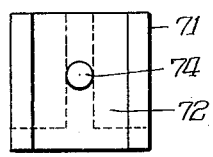
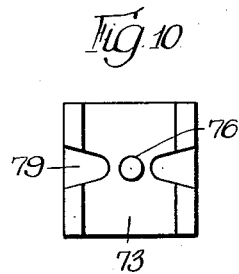
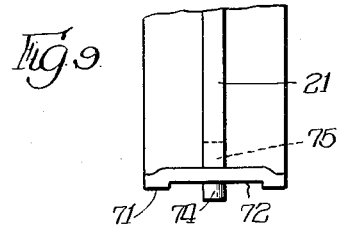
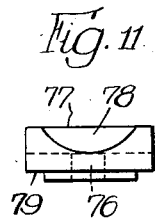
Inventor:
Edwin R. Evans, Patented Aug. 29, 1933

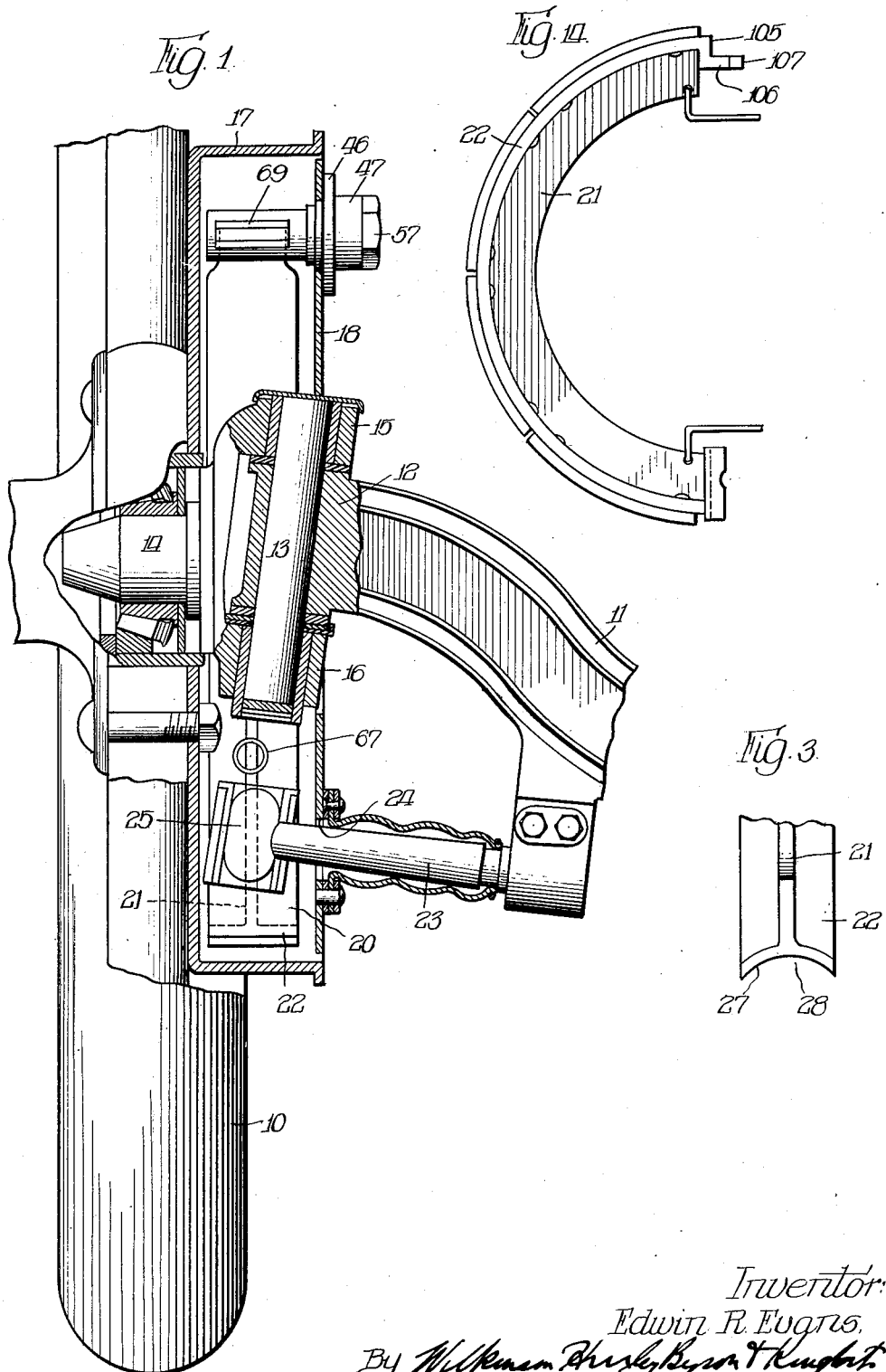

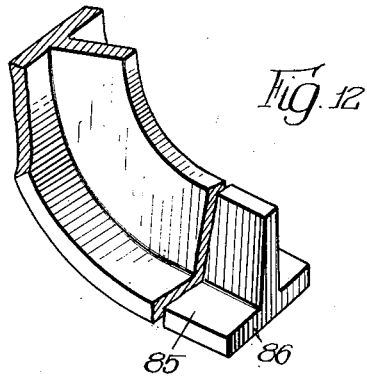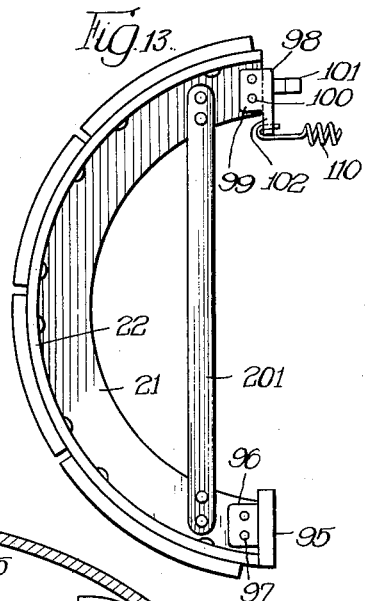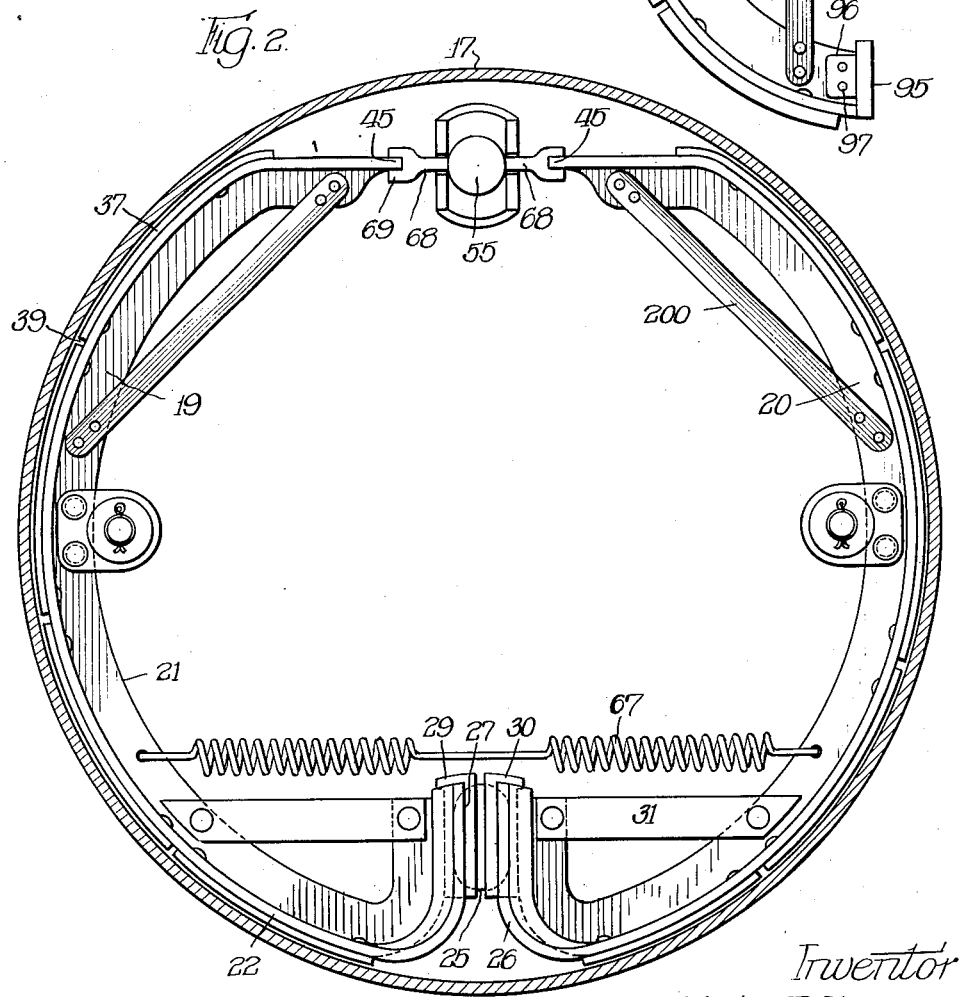

1,924,112

UNITED STATES PATENT OFFICE 1,924,112

BRAKE CONSTRUCTION

Edwin R. Evans, Chicago, Ill.

Original application March 30, 1928, Serial No. 265,884. Divided and this application March 16, 1931. Serial No. 522,835

5 Claims. (Cl. 188—250)

This invention relates to brakes and has particular reference to a brake adapted for use in connection with the wheels of motor vehicles.

It is an object of the present invention to provide a new and improved brake shoe construction whereby the shoes may be made from rolled sections.

It is also an object to provide a construction in which the shoes are formed with the end of the shoe turned up to afford a bearing for the thrust from the brake operating cam.

It is an additional object to provide a construction in which the turned up end is supported against the cam thrust by the integrally connected web of the rolled section.

A further object of this invention is to provide a brake shoe which will be interchangeable, that is, one which may be readily mounted on either side of any wheel on the vehicle.

Still another object of this invention is to provide novel means for anchoring and adjusting the brake shoes.

Still another object of the invention is to provide a brake construction wherein the brake shoes may be made of standard lengths, the invention contemplating the employment of bracing means for reinforcing shoes when the standard length shoes are employed for relatively large brakes.

Other and further objects will appear as the description proceeds.

This application is a division of my prior application Serial No. 265,884, filed March 30, 1928.

I have shown certain preferred embodiments of my invention in the accompanying drawings, in which—

Figure 1 is an elevational view partly in section showing the invention applied to a vehicle wheel;

Figure 2 is a detail elevational view of the brake drum and braking mechanism;

Figure 3 is a plan view of one end of the brake shoe shown in Figure 2;

Figure 4 is a fragmentary sectional view through one of the brake shoes;

Figure 5 is an elevational view partly in section of the shoe anchoring and adjusting mechanism;

Figure 6 is a sectional view taken substantially on the line 6—6 of Figure 5;

Figure 7 is an elevational view of one end of a slightly modified form of brake shoe;

Figure 8 is a front elevational view of the brake shoe shown in Figure 7;

Figure 9 is a fragmentary top plan view of the shoe shown in Figure 7;

Figure 10 is an elevational view of a wear plate adapted for attachment to the brake shoe shown in Figure 7;

Figure 11 is an end elevational view of the wear plate shown in Figure 10;

Figure 12 is a detail perspective view of another slightly modified form of brake shoe and wear plate adapted for attachment to the same;

Figure 13 is an elevational view of another modified form of brake shoe; and

Figure 14 is a view similar to Figure 11 showing still another form which the invention may assume.

Referring now particularly to the drawings wherein like reference characters designate corresponding parts throughout all views, 10 indicates one of the ground wheels of a motor vehicle. This wheel may be either a front or a rear wheel, since the brake constructed in accordance with this invention is adapted to be mounted on any ground engaging wheel of a vehicle. The wheel disclosed, however, is preferably a front wheel and 11 designates the front axle, which in accordance with the usual construction, is provided with a terminal bearing 12 adapted to receive the swivel pin 13. The wheel 10 is rotatable on the spindle 14, which spindle is provided with the upper and lower bearings 15 and 16 respectively for engagement with the opposite ends of the swivel pin 13.

Carried by the wheel 10 is a brake drum 17 and the inner portion of the drum is preferably closed by a cover plate 18 which is suitably mounted preferably by attachment to the bearings 15 and 16 so as to swivel with the wheel as a unit. The cover plate 18 serves not only to protect the brake shoes from dirt, but also serves as a support for the brake shoe adjusting mechanism hereinafter to be described.

Mounted within the brake drum 17 and adapted for movement into engagement with this brake drum, are the brake shoes 19 and 20 respectively. As clearly illustrated in Figure 2, each brake shoe is substantially semi-circular so that the two shoes, when combined, from a substantially circular brake surface adapted to engage practically the entire inner periphery of the brake drum 17.

Each brake shoe is substantially T-shaped in cross section, the web of the T being indicated by the reference character 21 and the base of the T being indicated by the reference character 22. The brake shoes are adapted to be moved into engagement with the drum 17 by means of a cam shaft 23, which passes through an opening 24 in the cover plate 18 and which carries on its free end a cam head 25 adapted to engage suitable wear plates or cam follower plates, one of which is carried by one end of each brake shoe. As brought out before, it forms a part of this invention to simplify the construction of those ends of the brake shoes which are adapted to be engaged by the cam head 25. Accordingly, as clearly shown in Figures 2 and 3, each brake shoe is preferably bent upwardly, adjacent one end as at 26 to form a substantially vertically extending end 27. The bases 22 of these ends 27 may then be slightly bent to form a recess 28 adapted to receive a bushing 29. As clearly shown in Figure 2 of the drawings, each bushing 29 is provided with a flange 30 adapted to seat on the upper edge of the end 27 whereby the bushings will be held firmly in place.

The cam head 25 is adapted to engage between the bushings 29 carried by adjacent ends of the brake shoes 19 and 20, so that upon a rotation of the cam shaft 23, the head 25 will be moved to force the bushings 29 and the brake shoes 19 and 20 away from each other. If desired, suitable bracing members 31 may connect the webs of the portions 27 with the webs of the substantially circular portions of the brake shoes to brace the ends 27 of the brake shoes. It will thus be seen that a simple and efficient structure will be formed on the ends of the brake shoes 19 and 20 for permitting spreading of these brake shoes by the cam head 25.

A further feature of this invention resides in the novel manner of applying the lining to each brake shoe. As clearly shown in Figure 4, the base 22 of each brake shoe is provided with a plurality of spaced apertures 35 and is serrated on its outer face as at 36. The lining 37 is formed of composition material and is molded on the base 22, during which molding operation, portions 38 of the lining will project into the apertures 35 to firmly lock the lining to the brake shoes. For preventing a breaking off of the portions 38, suitable ferrules 40 of copper or wire mesh may be first positioned in the aperture 35, and the lining then molded to enclose these ferrules. Thus the portions 38 will be strongly reinforced. Further by virtue of the serrations or corrugations on the outer face of the base 22, the lining 37 will be additionally secured to the brake shoes. The lining is molded in a plurality of sections, these sections being spaced from each other by the slots 39, whereby compensation may be made for the contraction and expansion of the lining incident to the use of the brake.

For anchoring and adjusting the brake shoes, there is provided the following structure. As clearly brought out before the brake shoes are formed from T-bars and in order to connect the brake shoes to the adjusting mechanism, it is preferable to cut the web 21 of each brake shoe short of the base 22 thereof, in order that there may be provided a free end 45 on the base 22 of each brake shoe. These free ends 45 are adapted to have operative engagement with the adjusting mechanism about to be described.

As clearly shown in Figures 1 and 5 of the drawings, there is secured to the plate 18 at a point substantially diametrically opposite the cam head 25, a plate like member 45 provided on its outer face with a boss 47 and on its inner face with a boss 48 which projects through the plate 18. The boss 47 is provided with the counter-bore 49, which communicates at its lower end with an opening 50 formed through the boss 48. Depending from the boss 48 is an extension 51 counterbored as at 52 to form an opening communicating with the opening 50 and provided with the diametrically opposed slots 53 through which the free ends 45 of the bases 22 are adapted to project, as clearly shown in Figures 5 and 6.

Slidably mounted in the opening 52 is a member 55 provided at its one end with a threaded portion 56. This threaded portion 56 is adapted to be received in the enlarged counterbore 49, so as to be free from threaded engagement with the boss 47. A nut 57 threadedly engages the threaded end of the member 55 for adjusting the member 55 longitudinally through the opening 52. Obviously rotation of the nut 57 in one direction will tend to draw the member 55 outwardly, while rotation of the nut 57 in the other direction will permit longitudinal movement of the member 55 inwardly.

For affording a measured longitudinal adjustment of the member 55, this member is provided, adjacent the free end of its threaded portion, with a radially arranged socket 60 adapted to receive a ball 61 urged outwardly by a spring 62. This ball is adapted to engage any one of a series of depressions 63 formed on the inner periphery of the nut 57 so that upon rotative movement of the nut or member 57, the ball 61 will successively enter these depressions 63 to indicate a measured rotation of the member or nut 57. Obviously rotation of the member 57 through a predetermined number of clicks, as caused by the successive engagement of the ball 61 in the depressions 63, will provide a predetermined rotational movement of the member 57 and longitudinal movement of the member 55.

For converting the longitudinal movement of the member 55 into lateral movement of the brake shoes, the body portion of the member 55 is provided with the diametrically opposed slots or grooves 65. These slots are tapered as clearly illustrated in Figure 5 of the drawings, and are adapted to receive the ends 45 of the bases 22, which ends are tapered as at 66 to conform to the taper of the grooves or slots 65. Obviously, longitudinal outward movement of the member 55 will urge the ends 45 away from each other to force the brake shoes into engagement with the brake drum 17, while longitudinal adjustment of the member 55 inwardly will permit movement of the members 45 toward each other to permit the brake shoes to move away from the drum 17. For drawing the brake shoes toward each other when the member 55 is adjusted inwardly, there are provided the springs 67 in accordance with the usual practice.

If desired, the connection between the member 55 and the ends 45 may be accomplished as shown in Figure 2. In this form the member 55 is provided with the lateral extensions 68 adapted to project through the slots 53 of the extension 51 and the free ends of these extensions are bifurcated as at 69 to embrace the ends 45. The portion between the bifurcations may be tapered similar to the grooves 65 whereby movement of the member 55 will move the brake shoes in the same manner as brought out above.

From the above it is believed that the structure and operation of the anchoring and adjusting mechanism will be readily apparent. For adjusting the brake shoes relative to the drum the cam head 25 is first turned to that position in which the brake shoes are permitted to most closely approach each other and the member 55 is then adjusted longitudinally outwardly to spread the shoes 19 and 20 until the same contact with the inner periphery of the brake drum. Each member 57 on each wheel is then rotated in the opposite direction a measured amount as indicated by the spring pressed ball 61, and the members 55 are forced inwardly in any desired manner until the member 57 contacts with the boss 47. This will release each set of brake shoes a measured amount, so that upon the actuation of the brakes mounted on the various wheels the braking forces will be applied uniformly.

In Figures 7, 8, 9, 10 and 11 there is shown a slightly modified form of construction in which a hot pressed wear plate is adapted to be rigidly mounted on those ends of the shoes 19 and 20 which engage the cam head 25. In this form of construction one end of each brake shoe is bent upwardly as at 70 to form the vertically extending end 71. This end 71 is provided on its outer face with a recess 72 adapted to receive a wear plate or cam follower plate 73. A pin 74 is mounted substantially centrally of the end 71, this pin having its one end rigidly mounted as at 75 in a recess formed in the web 21 of the brake shoe. The opposite end of the pin 74 is adapted to be received in an aperture 76 formed in the wear plate 73. The wear plate may be welded to the pin 74 or secured to the same in any desired manner.

For the rear wheels of the vehicle, each wear plate may be provided with a plane face 77, while for the front wheels of the vehicle, each wear plate 73 may be provided on its front face with an arcuate recess 78. Further, as clearly illustrated in Figure 10 of the drawings, each wear plate is provided on its front face with the recesses 79, one of which is arranged on either side of the vertical median line of the wear plate to provide clearance for the cam shaft 23. By providing the recess 79 on both sides of the wear plate, the wear plate is adapted for use on either the right or left brake shoe, since the cam shaft 23 may be projected inwardly through either one recess or the other. It will thus be seen that by interchanging the wear plates 73 for the front or rear wheels, the brake shoes will be adapted for use with either the front wheels or rear wheels of the vehicle.

Obviously in this form of construction the cam head 25 is adapted to engage the wear plates 73 to move the ends of the brake shoes away from each other and to effect an engagement of the brake shoes 19 and 20 with the brake drum 17.

In Figure 12, there is shown another slightly modified form of construction. In this form of construction, each brake shoe is bent at its lower end to form a substantially horizontally arranged portion 85 and the free end 86 of each of these portions is preferably finshed as by machining. Each wear plate or cam follower plate 87 is provided on one face with a T-shaped groove 88 adapted to receive the finished end 86 of its respective brake shoe. In assembling the wear plate with the brake shoe, the end 86 is inserted in the groove 88 and the members are then welded to each other or secured together in any desired way. In this manner, it will be found that a rigid construction will be formed which will readily withstand the constant thrust to which it is subjected during the actuation of the brake.

The wear plates 87 may be provided with the recesses 89 similar to the recesses 79 and may be provided with a plane face 90 for engagement with the cam head 25 or with the recess 91 shown in dotted lines, similar to the recess 78.

In Figure 13 there is shown still another slightly modified form of construction in which the web 21 of each brake shoe is cut off even at the end with the base 22. In this form of construction, the wear plate 95 is provided with the flange 96 which is adapted to be bolted or riveted to the web 21 as at 97. In this manner the wear plate 95 may be rigidly secured to the brake shoe and, if bolted, may be readily detached and replaced.

Further in this form of construction the ends 45 are eliminated and in their place an angle 98 provided with a flange 99 is bolted or riveted as at 100 to one end of the web 21. One leg 101 of the angle member 98 is adapted to be received in the grooves 65 in the member 55, while the other leg 102 of the angle member 98 is adapted to form an anchoring means for the spring 110. The ends 101 are tapered similar to the ends 45 and it is obvious that when these ends are engaged in the tapered grooves, longitudinal movement of the member 55 will move the shoes toward or away from each other.

In Figure 14, there is shown still another slightly modified form of construction in which base 22 of the brake shoe is extended beyond the web 21 and is bent downwardly as at 105, and then outwardly as at 106 to form the free end 107. This free end of 107 is tapered similar to the end 45 of the form of construction shown in Figure 2, and is adapted to be received in the tapered groove 65 of the member 55. By bending the base 22 as above described, the force exerted by the longitudinal movement of the member 55 is transmitted directly to the webs 21 of the brake shoes to assure a positive adjustment of the brake shoes.

In order to strengthen and otherwise reinforce the brake shoes, braces such as illustrated at 200 in Figure 2 may be employed, or braces such as indicated at 201 in Figure 13 may be utilized. By providing means for reinforcing the brake shoes these shoes may be constructed in standard lengths and when used in connection with larger brakes employing larger brake drums, or at any time when reinforcing and strengthening is necessary, braces such as shown at 200 and 201 may be utilized. When the brake shoes are made from stampings considerable metal can be saved by making the webs narrower and providing the required rigidity by the use of either of the types of bracing members just hereinbefore described.

While several forms of the invention have been described somewhat in detail, it is to be clearly understood that the description of the invention is for the purposes of illustration only, and is not to be construed as definitive of the limits to which the invention may be applied. The right is therefore reserved to make such changes in the details of construction and arrangement of parts as will fall within the purview of the attached claims.

I claim:

1. A brake shoe comprising a rolled section having a cylindrical lining receiving flange and an inwardly extending web, both flange and web being bent back to form an actuating face.

2. A brake shoe comprising a rolled section having a cylindrical lining receiving flange and an inwardly extending web, both flange and web being bent back to form an actuating face the bent back portion of the flange being curved in cross section to partially enclose an operating cam.

3. A brake shoe comprising a rolled section having a cylindrical lining receiving flange and an inwardly extending web, both flange and web being bent back to form an actuating face, and being bent laterally to conform to a wheel pivot axis extending outside the plane of the brake shoe.

4. A brake shoe comprising a rolled T-section having a cylindrical outer flange and inwardly extending web, an end of the section being bent back to form an actuating portion, the web being bent with the flange whereby the web is integrally connected with and supports the actuating flange face.

5. A brake shoe comprising a rolled T-section having a cylindrical outer flange and inwardly extending web, an end of the section being bent back to form an actuating portion, the web being bent with the flange whereby the web is integrally connected with and supports the actuating flange face, and braces connecting the bent back web portion and the web at a point spaced from the bent back portion.

EDWIN R. EVANS.